United States Patent
Kassen et al.

(10) Patent No.: US 11,136,040 B2
(45) Date of Patent: Oct. 5, 2021

(54) IMU BASED TRACTION CONTROL FOR WHEELED OR TRACKED MACHINE

(71) Applicant: Deere & Company, Moline, IL (US)

(72) Inventors: Daniel M. Kassen, Dubuque, IA (US); Michael G. Kean, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 379 days.

(21) Appl. No.: 15/984,540

(22) Filed: May 21, 2018

(65) Prior Publication Data

US 2019/0351910 A1    Nov. 21, 2019

(51) Int. Cl.
*B60W 30/18* (2012.01)
*G01C 21/12* (2006.01)

(52) U.S. Cl.
CPC ....... *B60W 30/18172* (2013.01); *G01C 21/12* (2013.01); *B60W 2420/52* (2013.01); *B60W 2520/10* (2013.01); *B60W 2520/26* (2013.01); *B60W 2556/60* (2020.02); *B60W 2720/26* (2013.01)

(58) Field of Classification Search
CPC ....... B60W 30/18172; B60W 2556/60; B60W 2420/52; B60W 2520/10; B60W 2520/26; B60W 2720/26; G01C 21/12; B60T 8/175; B60T 2210/16
See application file for complete search history.

(56) References Cited

U.S. PATENT DOCUMENTS

| | | | |
|---|---|---|---|
| 5,287,280 A | 2/1994 | Yamamoto et al. | |
| 6,321,866 B1* | 11/2001 | Prohaska | F16H 48/18 180/197 |
| 6,631,320 B1* | 10/2003 | Holt | B60T 8/175 180/197 |
| 7,856,303 B2 | 12/2010 | Thompson et al. | |
| 9,272,703 B2 | 3/2016 | Larsson et al. | |
| 9,555,706 B1* | 1/2017 | Mitchell | B60K 28/165 |
| 2002/0115530 A1* | 8/2002 | Skinner | B60W 10/06 477/77 |
| 2008/0179124 A1* | 7/2008 | Stratton | B60W 10/08 180/197 |

(Continued)

*Primary Examiner* — Bhavesh V Amin
(74) *Attorney, Agent, or Firm* — Taft Stettinius & Hollister LLP; Stephen F. Rost

(57) ABSTRACT

A method of determining wheel slippage condition in a work vehicle includes moving the work vehicle from a first position to a second position, determining a drivetrain ground speed of the work vehicle using a drivetrain component, determining a predicted ground speed of the work vehicle using a sensor, detecting a wheel slippage condition by comparing the drivetrain ground speed to the predicted ground speed, and generating a driveline modification command to adjust propulsion power of the drivetrain component until the wheel slippage condition reaches a specified target. A method of adjusting acceleration for a work vehicle includes measuring a drivetrain acceleration, measuring an absolute acceleration, using the absolute acceleration to predict a ground speed, determining a steady state condition based on the commanded machine motion, the drivetrain speed, and the absolute acceleration, and modifying the predicted ground speed based on determination of the steady state condition.

18 Claims, 6 Drawing Sheets

(56) References Cited

U.S. PATENT DOCUMENTS

| | | | |
|---|---|---|---|
| 2008/0208428 A1* | 8/2008 | Thompson | B60K 28/165 701/82 |
| 2010/0030471 A1* | 2/2010 | Watanabe | G01C 21/12 701/494 |
| 2010/0152942 A1* | 6/2010 | Stratton | B60T 8/175 701/25 |
| 2011/0257847 A1* | 10/2011 | Uematsu | B60T 8/1769 701/48 |
| 2013/0085036 A1* | 4/2013 | Anderson | B60W 30/18172 477/110 |
| 2015/0032344 A1* | 1/2015 | Hou | F16H 61/08 701/54 |
| 2015/0105992 A1* | 4/2015 | Larsson | B60K 6/12 701/89 |
| 2015/0203119 A1 | 7/2015 | Bird et al. | |
| 2015/0375719 A1* | 12/2015 | Zhang | B60T 8/175 701/70 |
| 2017/0113697 A1* | 4/2017 | Faivre | B60W 40/105 |
| 2017/0174192 A1* | 6/2017 | Ying | B60T 8/17616 |
| 2017/0234988 A1* | 8/2017 | Jafari | G01C 21/12 701/1 |
| 2017/0284805 A1* | 10/2017 | Zihajehzadeh | A63B 5/16 |
| 2018/0297484 A1* | 10/2018 | Suzuki | B60L 3/106 |
| 2019/0041863 A1* | 2/2019 | Okada | H03H 17/0257 |
| 2019/0135286 A1* | 5/2019 | Domingo | G01P 15/18 |
| 2019/0367178 A1* | 12/2019 | Matayoshi | G01S 17/58 |

\* cited by examiner

IMU BASED TRACTION CONTROL FOR WHEELED OR TRACKED MACHINE

FIELD OF THE DISCLOSURE

The present disclosure relates to detecting wheel or track slippage of a work machine and thereafter limiting the wheel or track slippage.

BACKGROUND OF THE DISCLOSURE

There are many traditional approaches to traction control slip detection. A first approach often requires a speed sensor in each wheel to detect a change in speed in one wheel relative to the others. These sensors add cost to the system and this comparative method is not effective when there are only two tracks instead of four wheels. A second approach includes using a radar detector to sense vehicle ground speed which is then compared to drivetrain speed to estimate when wheel slip is occurring. A third approach includes a ground speed sensor being used to override a locking command from the operator when the speed is too high to prevent damage. However in either of these situations the radar detector or sensor can be unreliable and is limited by ground conditions and travel speeds.

Thus there is a need for improvement for detecting wheel or track slippage and autonomously limiting the slippage.

SUMMARY

According to one embodiment, a method of determining wheel slippage in a work vehicle, the method comprising: moving the work vehicle a commanded machine motion that includes movement of the work vehicle from a first position to a second position; determining a drivetrain ground speed of the work vehicle using a drivetrain component while the work vehicle is moving from the first position to the second position; determining a predicted ground speed of the work vehicle using a sensor while the work vehicle is moving from the first position to the second position; detecting a wheel slippage condition by comparing the drivetrain ground speed to the predicted ground speed; and generating a driveline modification command to adjust a propulsion power of the drivetrain component until the wheel slippage condition reaches a specified target.

In one example of this embodiment, the method further comprises wherein the sensor is an inertial measurement unit; measuring an absolute acceleration with the inertial measurement unit while the work vehicle is moving from the first position to the second position; determining a steady state condition by comparing respectively the commanded machine motion, the drivetrain speed, and the absolute acceleration to a steady state machine motion, a steady state drivetrain speed, and a steady state acceleration; and adjusting the drivetrain ground speed based on the steady state condition to determine an adjusted drivetrain ground speed.

In one refinement of this embodiment, the method further comprises wherein the work vehicle further includes a ground speed sensor; measuring an absolute speed with the ground speed sensor while the work vehicle is moving from the first position to the second position; determining a steady state condition by comparing respectively the commanded machine motion, the drivetrain speed, and the absolute speed to a steady state machine motion, a steady state drivetrain speed, and a steady state speed; and adjusting the drivetrain ground speed based on the steady state condition to determine an adjusted drivetrain ground speed.

In another embodiment the method further comprises feeding back the adjusted drivetrain ground speed and the predicted ground speed to the adjusted drivetrain ground speed.

In another embodiment of the method, the measuring the absolute acceleration with the inertial measurement unit includes measuring a vehicle pitch angle and removing a gravitational component of the absolute acceleration by the inertial measurement unit.

In another embodiment of the method, the generating a driveline modification command includes engaging a differential lock to adjust the propulsion power to the drivetrain component until the wheel slippage condition reaches a specified target.

In another embodiment of the method, the generating the driveline modification command includes generating an engine throttle command to adjust the propulsion power to the drivetrain component until the wheel slippage condition reaches a specified target.

In another embodiment of the method, the drivetrain component includes a hydrostatic motor, and the generating the driveline modification command includes generating one or more of a pump displacement command or a motor displacement command to adjust the propulsion power to the hydrostatic motor until the wheel slippage condition reaches a specified target.

In another embodiment of this disclosure, a method for adjusting acceleration for a work vehicle, the method comprises providing a work vehicle having a vehicular controller, an inertial measurement unit, and a drivetrain component; moving the work vehicle a commanded machine motion that includes movement of the work vehicle from a first position to a second position; measuring a drivetrain acceleration based on the drivetrain component; measuring an absolute acceleration with the inertial measurement unit; using the measured absolute acceleration to predict a ground speed; determining a steady state condition based on the commanded machine motion, the drivetrain speed, and the absolute acceleration; and modifying the predicted ground speed based on the determination of the steady state condition.

In one embodiment the method further comprises wherein the work vehicle includes a sensor; measuring an absolute speed with the sensor while the work vehicle is moving from the first position to the second position; and wherein the determining the steady state condition includes comparing respectively the commanded machine motion, the drivetrain speed, the absolute acceleration, and the absolute speed to a steady state machine motion, a steady state drivetrain speed, a steady state acceleration, and a steady state speed.

In another embodiment the method, further comprises detecting a wheel slippage condition by comparing the drivetrain ground speed to the predicted ground speed; and generating a driveline modification command to adjust a propulsion power of the drivetrain component until the wheel slippage condition reaches a specified target.

In another embodiment of the method, the generating a driveline modification command includes engaging a differential lock to reduce the propulsion power to the drivetrain component until the wheel slippage condition reaches a specified target.

In another embodiment of the method, the generating the driveline modification command includes generating an engine throttle command to reduce the propulsion power to the drivetrain component until the wheel slippage condition reaches a specified target.

In another embodiment of the method, the drivetrain component includes a hydrostatic motor, and the generating the driveline modification command includes generating one or more of a pump displacement command or a motor displacement command to adjust the propulsion power to the hydrostatic motor until the wheel slippage condition reaches a specified target.

In another embodiment of this disclosure, a method of determining wheel slippage condition in a work vehicle, the method comprising: moving the work vehicle a commanded machine motion that includes movement of the work vehicle from a first position to a second position; determining a drivetrain acceleration of the work vehicle using a drivetrain component while the work vehicle is moving from the first position to the second position; measuring an absolute acceleration of the work vehicle using a sensor while the work vehicle is moving from the first position to the second position; comparing the drivetrain acceleration to the absolute acceleration to determine an acceleration difference; and generating a driveline modification command to adjust a propulsion power of the drivetrain component to thereby reduce the acceleration difference.

In another embodiment of the method, the generating the driveline modification command includes engaging a differential lock to reduce the propulsion power to the drivetrain component until the acceleration difference reaches a specified target.

In another embodiment of the method, the generating the driveline modification command includes generating an engine throttle command to reduce the propulsion power to the drivetrain component until the acceleration difference reaches a specified target.

In another embodiment of the method, the drivetrain component includes a hydrostatic motor, and the generating the driveline modification command includes generating one or more of a pump displacement command or a motor displacement command to adjust the propulsion power to the hydrostatic motor until the wheel slippage condition reaches a specified target.

In another embodiment of the method, the determining the drivetrain acceleration further comprises: using a drivetrain model that is representative of a frequency domain behavior of the drivetrain component; measuring at least one of a drivetrain component speed, a drivetrain component applied torque, and a drivetrain component displacement with a second sensor; and determining the drivetrain acceleration based upon the drivetrain model, the second sensor measurement of the drivetrain component, and the commanded machine motion.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
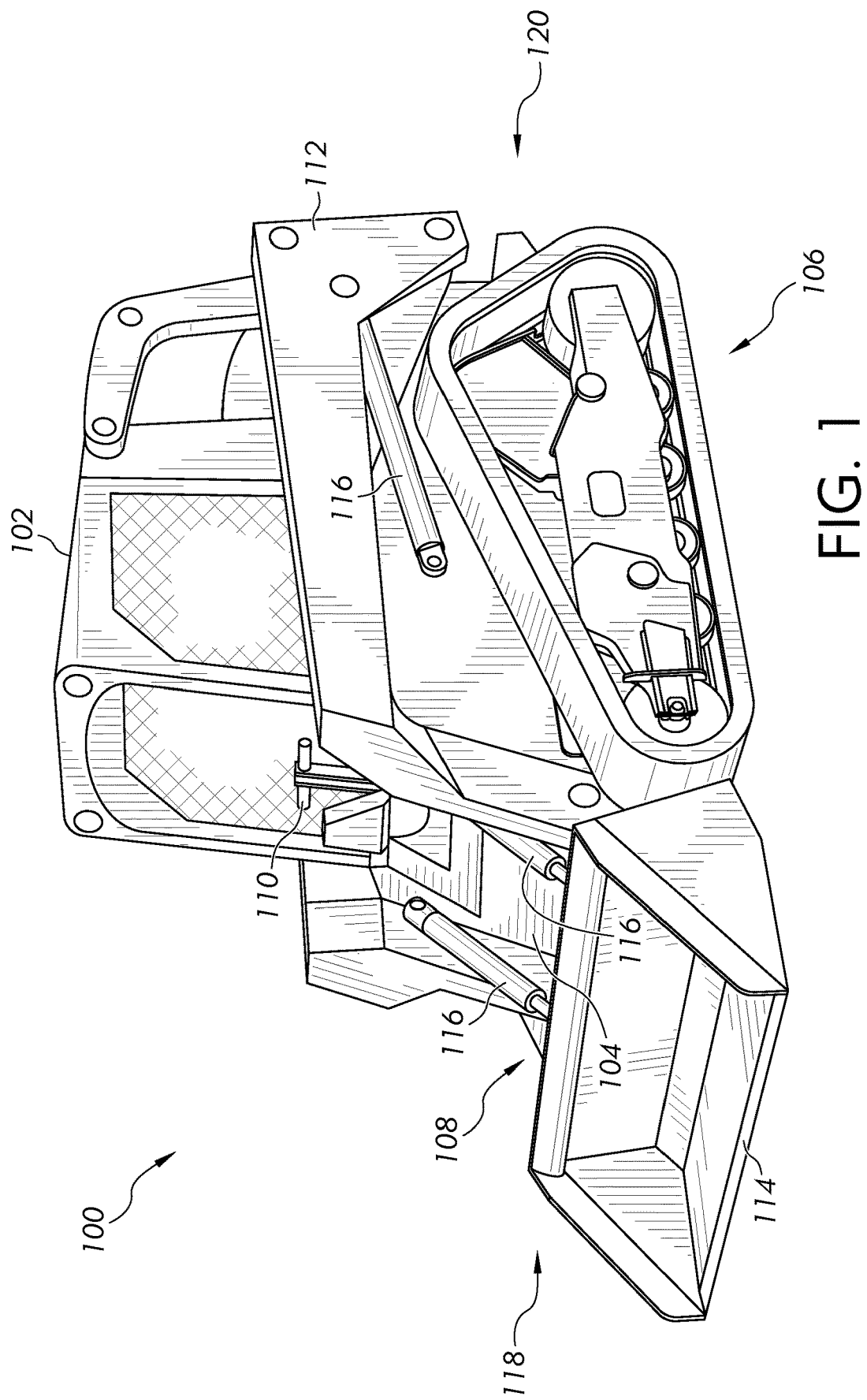
FIG. 1 is a perspective view of a first type of work machine.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

The present disclosure provides a system and process for controlling and detecting a tire or track slippage condition in such a way that the system can be incorporated in different sized machines or types of work vehicles. In addition, the system and control process is operable at all speeds of the work vehicles. After detection of tire or track slippage condition, the system and control process can autonomously limit the slippage by controlling a drivetrain of the work vehicle. By limiting the tire or track slippage, the disclosed method reduces tire and track wear, minimizes ground damage, and improves machine performance. This is further described below.

Many vehicles use inertial measurement units (IMU's) as sensors for a global positioning system or GPS correction or orientation spacing of a vehicle in space. IMU's typically include one or more of a three-axis accelerometer and a three-axis gyroscope with sensor fusion algorithms. Generally, when the vehicle is stationary, the accelerometer measures the direction of gravity. Generally, under dynamic conditions such as when the vehicle is moving, the gyroscope measures the rate of change of the vehicle's attitude. These two measurements can be combined to provide a more accurate estimate of the vehicle's attitude. However, gyroscope measurements are integrated to estimate changes in orientation, therefore bias error and noise error can lead to drift in the orientation over time as these values are added to the true change in orientation at each step. The gyro bias error is quantified as an angle error and will increase proportionally with time when the gyroscopes output is integrated to produce an angle. Moreover, the present disclosure provides a system and process for determining steady state and applying a drivetrain speed to stabilize an IMU to eliminate drift, bias, or noise that is further described below.

The present disclosure discusses two types of sensors that can be used to determine the absolute velocity and/or absolute acceleration. A first type of sensor is an IMU sensor which can be very accurate at higher frequency measurements. A second type of sensor is for radar speed or GPS which can be very accurate at lower frequency or constant speed measurements. Therefore the combination of the IMU sensor and either a GPS or radar speed sensor can be beneficial under certain situations.

The present disclosure discusses two types of work vehicles, a wheel loader and a compact truck loader or CTL, wherein wheel or track slippage is detected and can be autonomously limited. The work vehicle could be a construction vehicle, agriculture vehicle, or any other type of work vehicle. The present disclosure discusses a drivetrain component which can include one of many parts of the work vehicle such as engine, hydrostat pump, hydrostat motor, hydraulic pump, differential lock, and torque converter. There may be other parts of the work vehicle that may correspond to the drivetrain component.

For a wheel loader in a wheel slippage condition, propulsion power to the drivetrain is controlled by an engine throttle command. Additionally or alternatively to the engine throttle command, the differential lock can be engaged. If slip is occurring, then propulsion power will be reduced and/or the differential lock engaged until the wheel slip reaches the specified target. Because of the drivetrain similarities, the wheel loader configuration could be applied to an articulated dump truck (ADT) as well.

For the CTL in a wheel or track slippage condition, propulsion power to the hydrostatic transmission is controlled by a pump displacement command. The CTL has a hydrostatic transmission, so track speed can be calculated from the wheel motor speed. In a hydrostatic system, pump displacement controls the flow to the motor, and therefore the wheel speed, directly. Because of this, a feedforward command loop can be included for quicker response time by driving the wheel/track speed to the current vehicle ground speed plus the slip target. If a slip condition is occurring, the feedforward command loop or feedback algorithm on the microcontroller can autonomously limit slip by controlling the propulsion power.

Slip can be measured as a slip ratio, as differential velocity slip, or by integrating the acceleration to determine the differential velocity slip. The differential slip velocity is determined by: $\Delta V_S = R \cdot \omega_T - V_g$. The slip ratio is determined by:

$$\frac{R \cdot \omega_T - V_g}{R \cdot \omega_T} = \frac{\Delta V_S}{R \cdot \omega_T}.$$

An alternate way to calculate differential slip velocity is determined by: $\Delta V_S = \int (R \cdot \alpha_T - \alpha_x) dt$. In these calculations the notation of R is the effective tire radius, $\omega_T$ is the tire angular velocity, $V_g$ is the vehicle ground velocity, $\alpha_T$ is the tire angular acceleration, and $\alpha_x$ is the vehicle ground acceleration. Integrating the differential acceleration to determine the differential slip velocity includes $\alpha_T$ for the tire angular acceleration and ax for the vehicle ground acceleration.

The present disclosure also includes determining the absolute acceleration and comparing this absolute acceleration to the driveline acceleration or wheel acceleration to determine a differential slip acceleration. By comparing accelerations the system does not specifically measure the machine ground velocity. The differential slip acceleration can be integrated to determine a slip differential velocity.

Referring now to FIG. 1, a compact track loader or work machine 100 is shown. The work machine 100 may have a front portion 118, a rear portion 120, and a cab 102 coupled to a frame 104. Also coupled to the frame 104 may be a first track assembly 106 and a second track assembly 108 (e.g., one on a leftside of the machine and another on a rightside thereof) that engage and move along the ground during operation. The first and second track assemblies 106 and 108 can each be driven by a drive sprocket (not shown) and a front idler wheel about which a track chain is entrained. A left hydrostatic transmission (not shown) can operably drive the drive sprocket so as to drive the track chain of the left or first track assembly 106 thereby providing motive power for moving the machine 100. A right hydrostatic transmission (not shown) can operably drive the drive sprocket so as to drive the track chain of the right or second track assembly 108 thereby providing motive power for moving the machine 100. The left and right hydrostatic transmissions can include a variable displacement pump and may include a fixed or variable displacement motor. Alternatively, a first power-transferring drivetrain (not illustrated) may be coupled for driving the first track assembly 106 at various selected speeds and either in forward or reverse modes. A second power-transferring drivetrain (not illustrated) may be coupled for driving the second track assembly 108. For purposes of this disclosure, the term "transmission" can refer to any power-transferring, variable speed device or drivetrain. This can include a transaxle or electric drivetrain machine without a gear box.

An operator may be positioned in the cab 102 and have access to a plurality of controls 110. The plurality of controls may include joysticks, levers, wheels, push buttons, switches, knobs, dials, and any other known control mechanism for controlling a function of the machine 100. Further, an engine compartment that houses an engine may be supported by the frame 104 wherein the engine can provide the motive power for operating any implements based on the operator's input to the controls 110.

The work machine 100 may also have a boom arm 112 pivotally coupled to the frame 104 at one end and to an implement (e.g., a bucket 114) at an opposite end. The boom arm 112 and the implement or bucket 114 may further be coupled to the frame 104 through one or more actuators 116 that allow the operator to control the positioning of the bucket 114 via the controls 110. Each of the actuators 116 can be controlled mechanically, hydraulically, pneumatically, electrically or by any other means known to the skilled artisan.

While the work machine 100 is shown and described as a compact track loader, this disclosure is not limited in application to compact track loaders. More specifically, any work machine that utilizes an inertial measurement unit or IMU sensor may benefit from the teachings of this disclosure. Any work machine that utilizes GPS or radar sensor for vehicle speed measurement may also benefit from the teachings of this disclosure. This disclosure applies to work machines that use a hydrostatic transmission. This disclosure is also applicable to any size of work machine and the compact track loader is only referenced herein as one example of a type of work machine. Accordingly, a skid steer loader, excavator, crawler or any other similar work machine is considered herein with left and right hydrostatic drives that use skid turns. This disclosure is also applicable to any commanded vehicle motion of a work machine. Some non-limiting examples of commanded vehicle motion include movement of a linkage relative to a chassis or movement of a bucket or other implement relative to the chassis.

Figure 2:
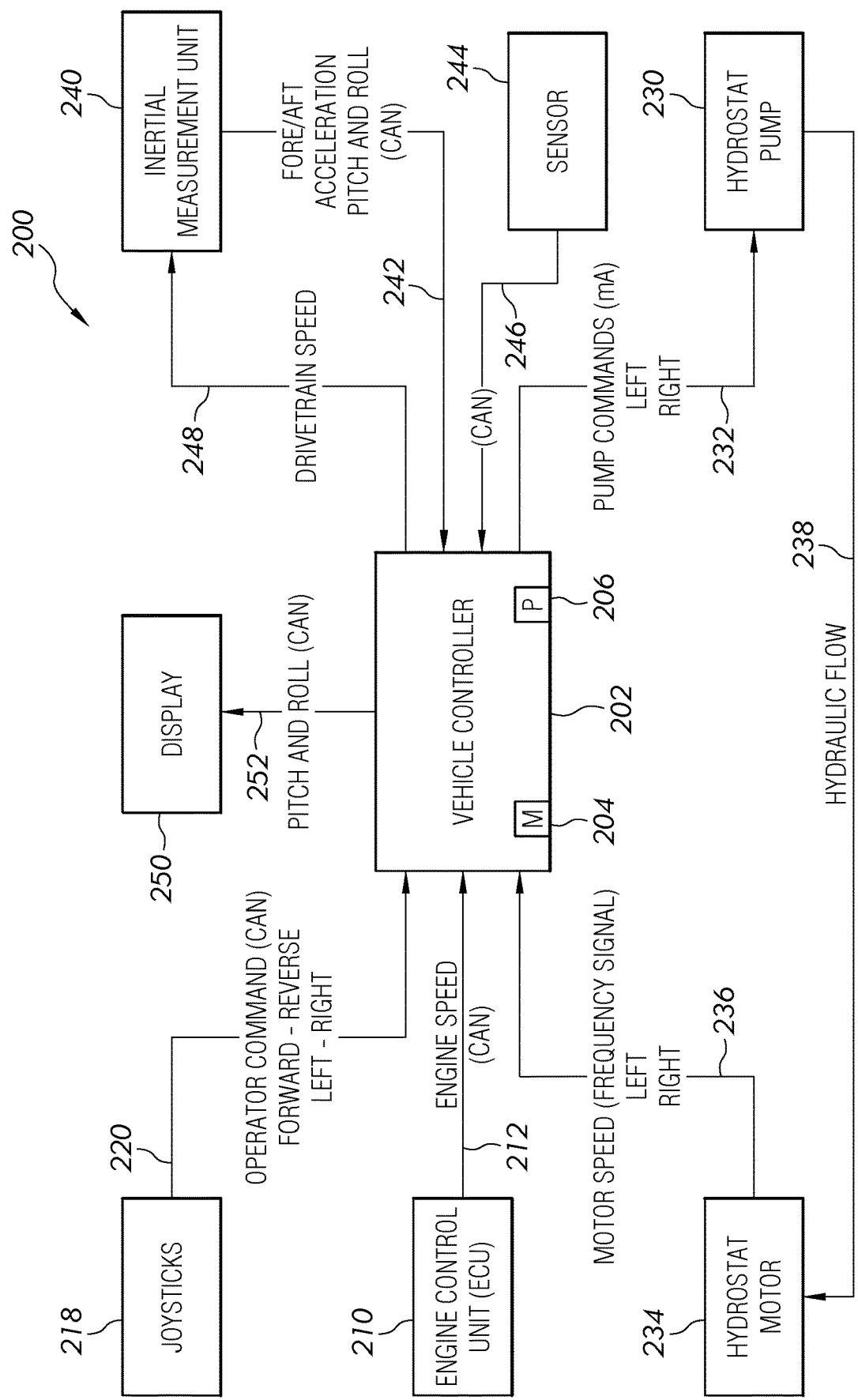
FIG. 2 is a schematic diagram for operating the machine of FIG. 1.

In the present disclosure, referring to FIG. 2, the machine 100 includes a control system 200 with a controller 202 for controlling the operation of the machine. The controller 202 can include a memory 204 for storing software, logic, algorithms, programs, a set of instructions, etc. for controlling the machine 100. The controller 202 can also include a processor 206 for carrying out or executing the software, logic, algorithms, programs, set of instructions, etc. stored in the memory 204. The memory 204 can also store look-up tables, graphical representations of various functions, and other data or information for carrying out or executing the software, logic, algorithms, programs, set of instructions, etc. and controlling the machine 100.

The controller 202 can include a plurality of inputs and a plurality of outputs. For instance, the controller 202 can receive a signal from one or more inputs and send a corresponding signal to an output to execute a function or operation. As shown in FIG. 2, one or more of the inputs can be an electrical connection between the controller 202 and an engine control module or unit 210. The electrical connection can be made via a CAN bus 212 or other communication link (e.g., wireless transceivers). Other conventional communication protocols may include J1587 data bus, J1939 data bus, IESCAN data bus, etc. Communication across the CAN bus 212 can include a commanded engine speed, actual engine speed, current engine speed, throttle position, engine torque, and other engine-specific variables.

The controller 202 can also be in electrical communication with different operator input mechanisms. For example, a first operator input mechanism 218 can include a joystick, throttle control mechanism, pedal, lever, switch, or other control mechanism. The first operator input mechanism 218 may be located within the cab 110 of the machine 100. An input command, e.g., a movement of a joystick, applied to the first operator input mechanism 218 can be communicated to the controller 202 via communication link 220. Similarly, the machine 100 can include a second operator input mechanism (not illustrated) located within the cab 110 of the machine 100 for sending another signal to the controller 202. A different communication link can electrically couple the second operator input mechanism with the controller 202. In alternative embodiments each of the first input control mechanism 218 and the second input control mechanism may share a common communication link with controller 202. Similarly, other communication links could be shared amongst multiple components in alternative embodiments. As an example, the first input control mechanism 218 may be a joystick or lever for controlling an implement 114 of the machine 100 and the second input control mechanism may be a throttle control mechanism. In FIG. 1, the implement is shown as a bucket 114, but this disclosure is not intended to be limited to a bucket. Other implements for performing craning, digging, grading, and other operations are contemplated herein.

The controller 202 is in electrical communication with a hydrostatic transmission circuit that includes a hydrostatic transmission pump 230, a hydrostatic transmission motor 234, and a pump controller (not illustrated) that can include and provide a plurality of inputs and a plurality of outputs to the hydrostatic transmission pump 230 and the hydrostatic transmission motor 234. As can be appreciated, there is a left hydrostatic transmission circuit for the left or first track assembly 106 and a right hydrostatic transmission circuit for the right or second track assembly 108 wherein both the left and the right hydrostatic transmissions circuits provide similar information to the pump controller and the controller 202. The controller 202 is in electrical communication via a pump command communication link 232 with the hydrostatic transmission pump 230 to provide pump command information thereto. The controller 202 is also in electrical communication with the hydrostatic transmission motor 234 via a motor communication link 236 to receive motor speed information. The hydrostatic transmission pump 230 is in fluid communication with the hydrostatic transmission motor 234 via a hydraulic flow path 238 that runs between the hydrostatic transmission pump 230 and the hydrostatic transmission motor 234. The hydrostatic transmission pump 230 provides and pumps oil or other hydraulic fluid to the hydrostatic transmission motor 234 and thereby drives the hydrostatic transmission motor 234. The controller 202 provides a pump displacement measurement to the pump controller and the hydrostatic transmission pump 230 which in turn drives the hydrostatic transmission motor 234. The hydrostatic transmission motor 234 thereafter provides a motor speed and/or motor displacement as a frequency signal via the motor communication link 236 to the controller 202.

The controller 202 is also in electrical communication with an Inertial Measurement Unit (IMU) 240 via a CAN bus 242 that provides and receives or exchanges vehicle information with the IMU 240 which is described in more detail below. The electrical communication between the controller 202 and the IMU 240 is a two-way communication in which the IMU 240 provides information to the controller 202 and receives information from the controller 202. The controller 202 is configured to process the information received from the IMU 240 along with any motor speed information received from the hydrostat motor 234 and thereafter provide an adjusted measurement to the controller 202 for further use, as described in more detail below. The IMU 240 is configured to receive a drivetrain speed 248 for further use, as described in more detail below. In one embodiment, the IMU 240 is positioned on a chassis or a center of gravity and center of rotation of the machine 100; however, in other embodiments the IMU 240 can be positioned elsewhere on the machine 100.

The controller 202 is in electrical communication with a sensor 244 via a CAN bus 246 that provides and receives or exchanges vehicle information with the sensor 244. The electrical communication between the controller 202 and the sensor 244 is a one-way communication in which the sensor 244 provides information to the controller 202. The sensor 244 can include radar or GPS in some embodiments. The sensor 244 may communicate with the controller 202 to identify the geographic location of the machine 100. Further, the sensor 244 may communicate with the CAN 246 as well to identify an actual vehicle speed based on the different geographic locations identified over time. The sensor 244 may be part of the machine 100 or an entirely separate assembly.

The controller 202 is configured to process the information received from the sensor 244 and thereafter provide an adjusted measurement to the controller 202 for further use, as described in more detail below. The controller 202 is in electrical communication with a display 250 via a CAN bus 252. The controller 202 provides information to the display 250 for the operator to review and use as desired.

Turning now to the IMU 240 that includes an accelerometer that measures the static orientation of the machine 100 and a gyroscope that measures the dynamic orientation of the machine 100 for each of the three vehicle axes: pitch (Y axis), roll (X axis), and yaw (Z axis). As such, the IMU 240 includes a pitch accelerometer, a roll accelerometer, and a yaw accelerometer. The IMU 240 also includes a pitch gyroscope, a roll gyroscope, and a yaw gyroscope. The IMU 240 can output raw sensor data and calculate orientation, e.g., pitch, roll, and yaw. Each of the accelerometers detects a corresponding linear acceleration by measuring gravity and dynamics. The total acceleration is composed of a gravitational component and a dynamic component, wherein the dynamic component causes a change in velocity. Sensor bias, sensor noise, and other errors can affect the measured acceleration. Generally, sensor bias is a small offset in the average signal output of the accelerometer (or gyroscope) which can contribute to pitch or roll angle error. Generally, sensor noise is any unwanted signal generated from the accelerometer (or gyroscope) that interferes with measurement of the desired signal. The noise level will also determine the minimum sensor output that is distinguishable from the background noise of the sensor or noise floor. In the present application, these errors can be minimized or eliminated and the accelerometer can be used over a wider range of operating conditions when accounting for the motion of the vehicle by using a drivetrain output along with the actual accelerometer reading as described below.

Each of the gyroscopes detects a corresponding rotation rate by measuring the change in orientation. The gyroscopes measure the true angular rates but have an additional bias error and an additional noise error. Since the gyroscope measurements are integrated to estimate changes in orientation, bias error and noise error lead to drift in the orientation over time as these values are added to the true change in orientation at each step. The gyro bias error is quantified as an angle error and will increase proportionally with time when the gyroscopes output is integrated to produce an angle. Optionally, the IMU 240 can include a magnetometer for each of the three vehicle axes: pitch, roll, and yaw.

The pitch accelerometer, roll accelerometer, and yaw accelerometer of the IMU 240 may not be accurate due to built in assumptions used in the calculation of the pitch angle and the roll angle. Therefore, any measured horizontal or roll accelerations may include sensor error in the roll accelerometer or in the vertical gyroscope. These measured errors will also accumulate for other commanded vehicle motions on a work machine or other type of machine.

The pitch gyroscope, roll gyroscope, and the yaw gyroscope of the IMU 240 provide the orientation (roll, pitch, and yaw) of the machine 100 relative to the earth. Generally, in vertical gyro algorithms, the data from the pitch accelerometer, roll accelerometer, yaw accelerometer, pitch gyroscope, roll gyroscope, and yaw gyroscope are combined. In one form, an assumption is zero or near zero average horizontal acceleration. This assumption assumes that the measured acceleration gives the direction of gravity. This assumption is then used to stabilize the roll and pitch so that the drift caused by the gyros does not degrade the measurements. This assumption simplifies the calculations as the direction of the measured acceleration is accounted for in the calculations, but the magnitude of the acceleration is not accounted for in the calculations.

The accelerometer and the gyro measurements may be fused using a complementary filter. Generally, the complementary filter takes slow moving signals from the accelerometer and fast moving signals from the gyroscope and combines them. The accelerometer signals are passed through a low-pass filter and the gyroscope signals are passed through a high-pass filter and combined to give the final rate. The frequency response of the low-pass and high-pass filters add up to 1 at all frequencies. The vertical gyro algorithm behaves as a low pass filter on accelerations A and a high pass filter on rotations or ω. This means that at any given time the complete signal is subject to either low pass or high pass. Moreover gravity is in the direction of the measured acceleration and is removed from the algorithm.

The present application is also directed to determining a steady state condition and using the drivetrain speed 248 to stabilize the IMU 240 by combining the drivetrain speed 248 with any measured dynamic accelerations by the IMU 240. The IMU 240 receives the drivetrain speed 248 from the controller 202 and thereafter adjusts a pitch measurement to create an adjusted pitch and also adjusts a roll measurement to create an adjusted roll. The IMU 240 sends the adjusted pitch and the adjusted roll to the controller 202. The IMU 240 processes a compensated vertical gyro algorithm. It was discovered that using the compensated vertical gyro with horizontal accelerations that are based on the commanded machine motion or the gross motion of the machine as indicated by the drivetrain speed 248 in a steady state condition, will improve the accuracy of the machine 100. The accuracy of the machine 100 using the vertical gyro with zero average horizontal acceleration will not be as accurate as compared to the compensated vertical gyro algorithm with horizontal accelerations that are based on the drivetrain speed 248. In the original vertical gyro algorithm, all dynamic accelerations in the horizontal plane contribute error to the direction of the acceleration compared to gravity. In the compensated vertical gyro algorithm as described in the present application, the drivetrain speed or drivetrain acceleration is subtracted first.

It was discovered that the drivetrain speed or drivetrain acceleration based on commanded machine motion or gross machine motion can be calculated on a vehicular controller and communicated to the IMU 240 where it is combined with the measured acceleration from the IMU 240. The combined or newly calculated pitch and roll accelerations are communicated from the IMU 240 to the vehicular controller 202 for use with calculations on the vehicular controller 202. This disclosure can be directed to any type of machine having a hydrostatic drive, any type of gross motion of the machine, and any type of commanded machine motion.

Figure 3:
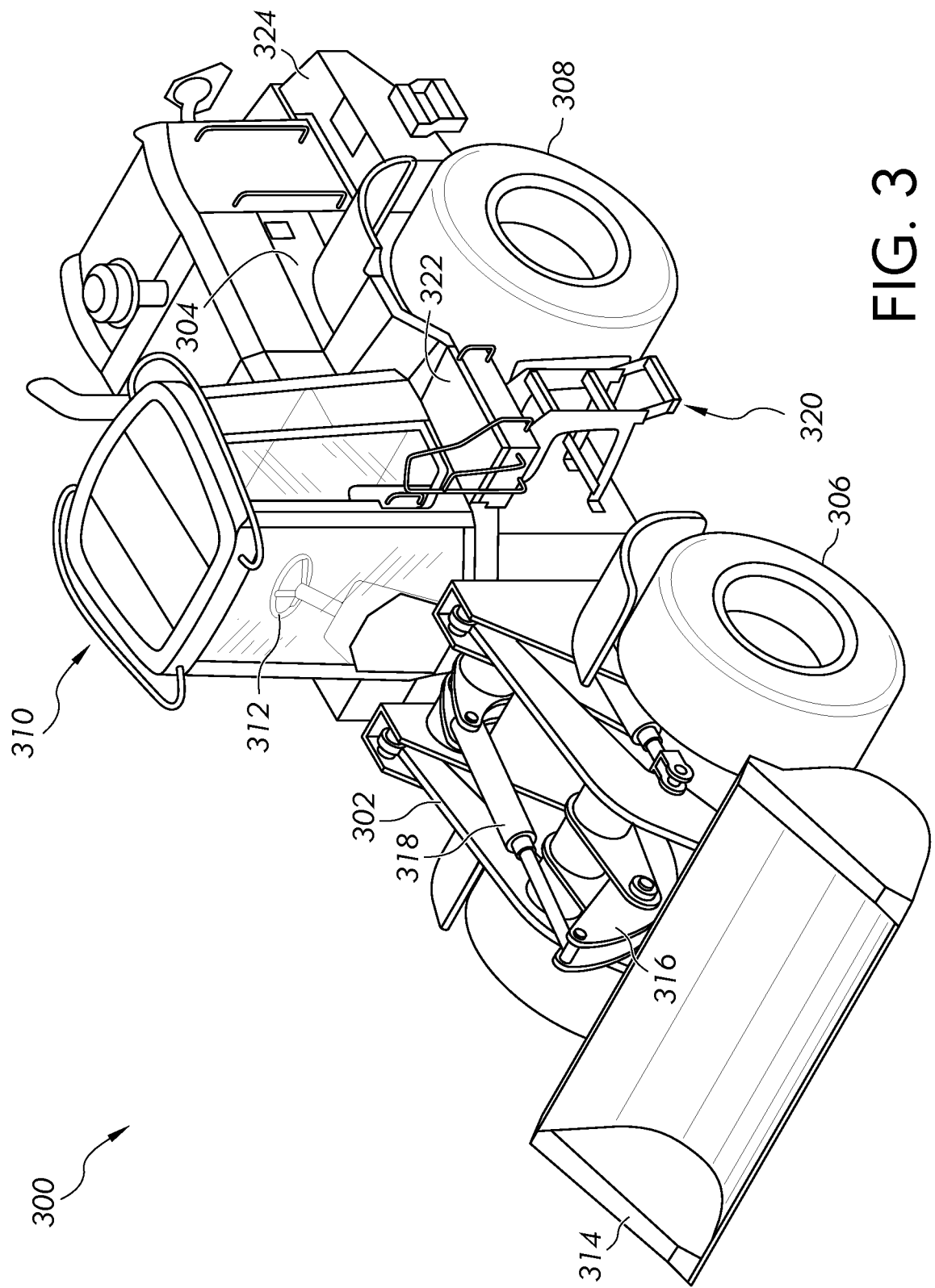
FIG. 3 is a perspective view of a second type of work machine.

With reference to FIG. 3 of the present disclosure, a work vehicle such as a front loader 300 is shown. The vehicle 300 includes a front frame 302 and a rear frame assembly 304 that are pivotally joined together at an articulation pivot or joint (not shown). The front frame 302 includes a front axle 306 and the rear frame assembly 304 includes a rear axle 308 to which wheels or tracks can be mounted. Front ground engaging wheels 306 are coupled to the front axle 306 and rear ground engaging wheels 308 are coupled to the rear axle 308 for supporting and propelling the vehicle 300. While an embodiment utilizing tires is described with the loader 300, this disclosure also considers utilizing work machines that have track assemblies instead of tires.

The front frame assembly 302 is provided with a work implement in the form of a loader bucket 314 that is controllably coupled to the front frame assembly 302 by a coupler or mechanical linkage 316. The bucket 314 can be actuated by a hydraulic cylinder 318 which is coupled to the coupler 316. In other embodiments, the front frame assembly 302 can be coupled with a pair of forks, a blade, a rotary tiller, a roller level, a rotary cutter, a trencher, and other known work implements. The rear frame assembly 304 can include an operator cab 310 in which an operator controls the vehicle 300 using vehicle controls 312. The vehicle controls 312 can include a joystick or steering wheel for controlling movement of the front ground engaging wheels 306 and rear ground engaging wheels 308 and articulating the front frame assembly 302 relative to the rear frame assembly 304.

The work vehicle 300 can include a cab entrance 320 defined as an opening in the cab 310. A set of steps and front platform 322 provide easy access to the operator's cab 310. A rear platform 324 is mounted to the rear frame 304. The work vehicle 300 can include a conventional fuel-injection engine and transmission with a torque converter. The work vehicle 300 can include a powertrain and drive assembly (not illustrated). The powertrain and drive assembly includes an engine and a torque converter transmission (not illustrated). The transmission can be a 5-speed transmission with torque converter lockup in different gear ranges for better acceleration, speed cycles, power and fuel efficiency during transport, and ramp climbing. One or more hydraulic pumps (not illustrated) can be mounted to the transmission and operated at engine speed. A driveline (not illustrated) is disposed between the transmission and front axle 306 and rear axle 308 for transferring power thereto.

The loader 300 includes a control system similar to the control system 200 illustrated in FIG. 2, however the control system for loader 300 includes all of the same elements except does not include a hydrostatic transmission circuit with the hydrostat motor 234 and the hydrostat pump 230. Instead of the hydrostatic transmission circuit, the control system for the loader 300 includes a torque converter transmission circuit that can include and provide a plurality of inputs and a plurality of outputs to the engine, the transmission, and the hydraulic pumps.

Figure 4:
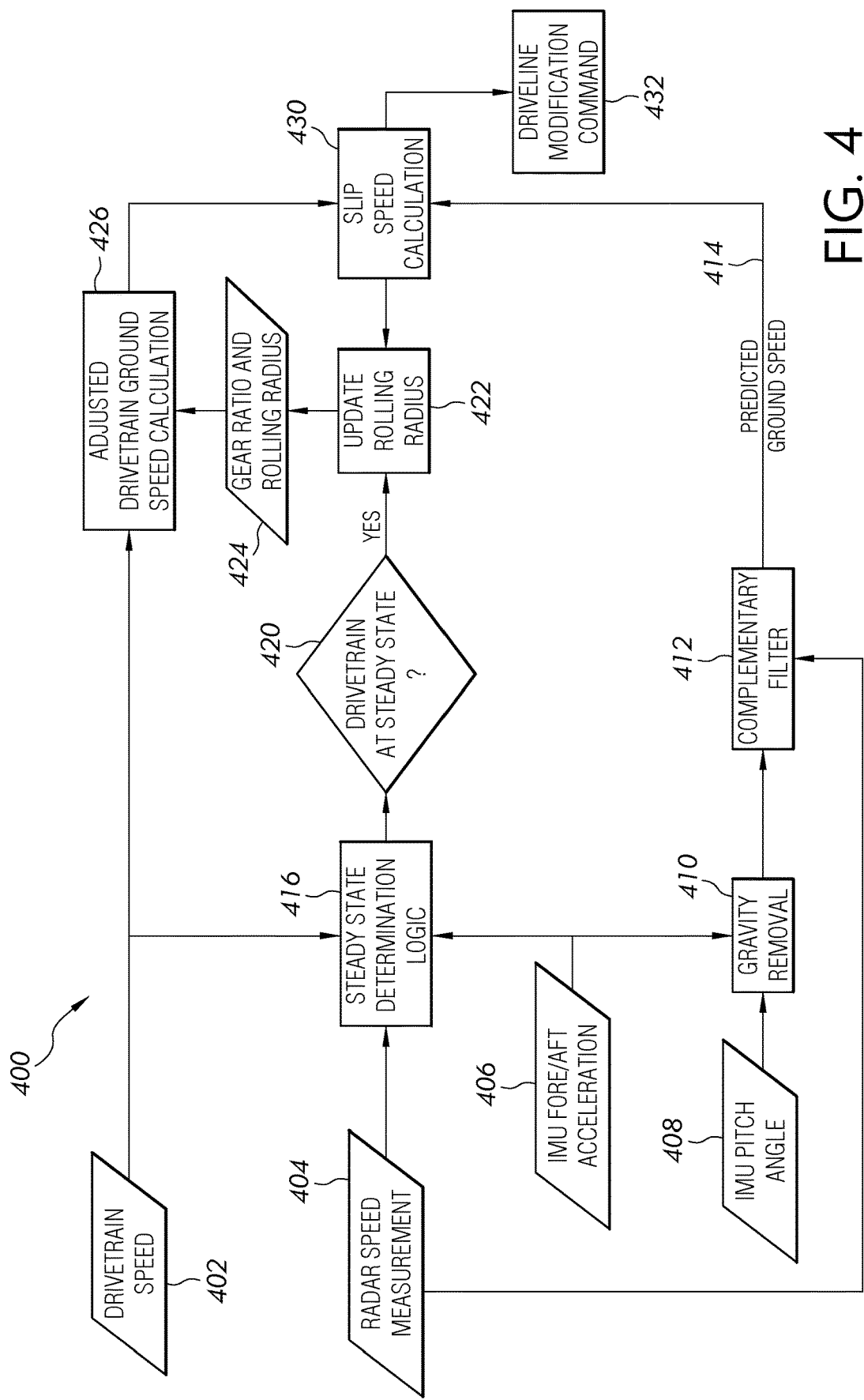
FIG. 4 is a schematic diagram of various inputs used in determining wheel slippage.
Figure 5:
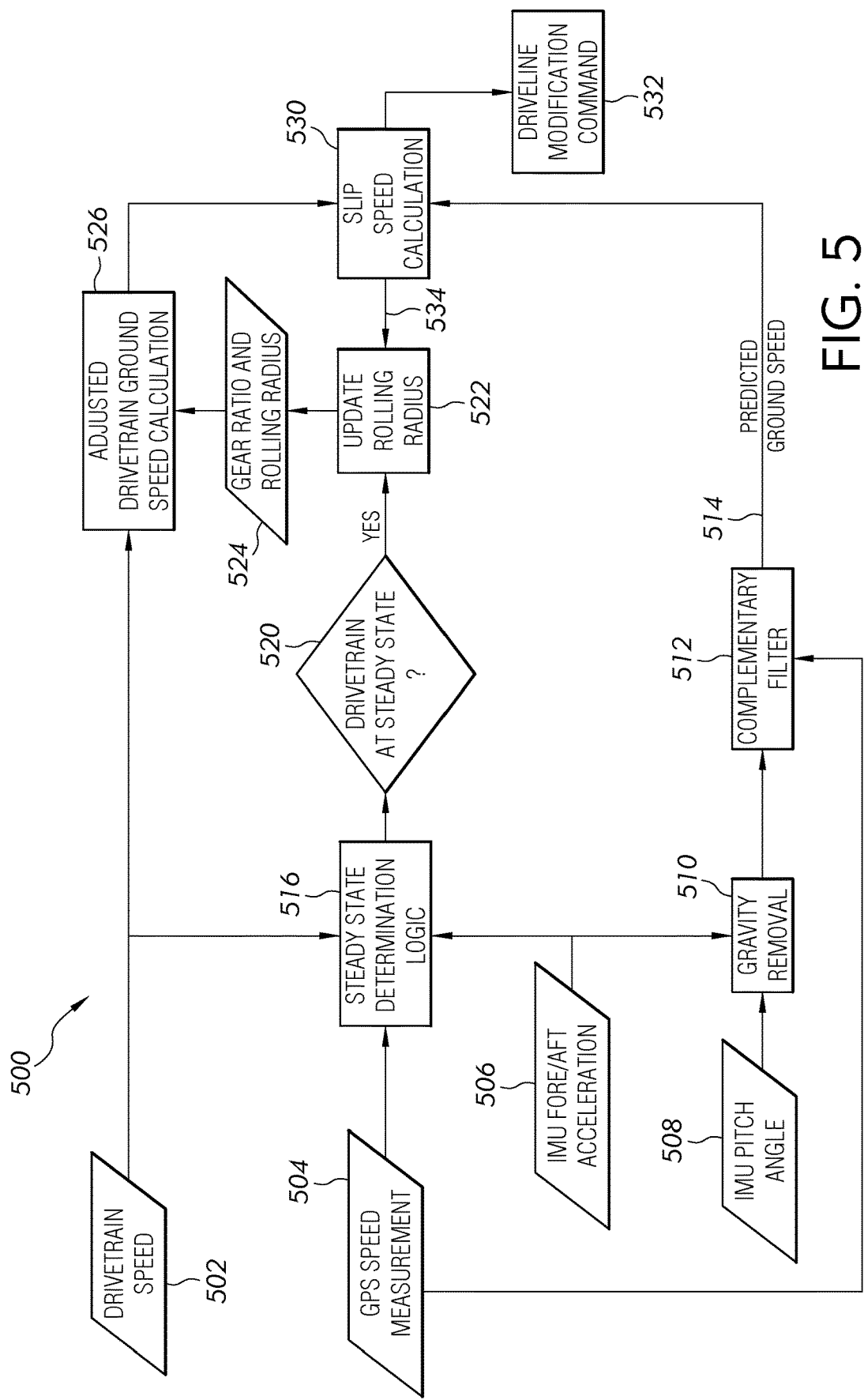
FIG. 5 is a schematic diagram of various inputs used in determining wheel slippage.

Turning now to FIGS. 4 and 5, are schematic diagrams of various inputs used in determining wheel slippage 400 and wheel slippage 500. The reference numbers for the 400's correspond to the reference numbers 500's, unless noted otherwise, and the description is applicable for both sets of reference numbers. FIGS. 4 and 5 are similar in all aspects except a radar speed measurement 404 is determined in FIG. 4 and a GPS speed measurement 504 is determined in FIG. 5, as described below.

In both FIGS. 4 and 5, the work vehicle or machine 100 is moved a commanded machine motion that includes movement of the work vehicle from a first position to a second position. A drivetrain speed 402 is determined from one or more of an engine speed, a pump command, and/or a motor speed as described next. The engine control unit 210 provides an engine speed via the CAN bus 212 to the controller 202. The controller 202 provides a pump command that includes a pump displacement or flow measurement via the pump command communication link 232 to the hydrostat pump 230. The pump controller includes computer software that calculates the relationship between the pump command and track speed. The pump output can be determined for forward travel as well as reverse travel. The calibration is performed the same in forward and reverse but there may be different offsets and slopes in each direction. Next in a conversion step, the pump output is converted to a motor speed using a sprocket radius of the machine 100 wherein motor speed is a function of displacement and flow. The engine speed, the motor speed, and/or the pump command are converted to the drivetrain speed 402.

The sensor 244 provides a radar speed measurement 404 via the CAN bus 246 to the controller 202. The IMU 240 provides an IMU fore/aft acceleration 406 and an IMU Pitch Angle 408 to the controller 202. The IMU fore/aft acceleration 406 is an absolute acceleration. In one form, the IMU fore/aft acceleration 406 can be used to determine a predicted ground speed 414 of the machine 100 while the machine 100 is moving from the first position to the second position.

The controller 202 then removes gravity 410 and the fore/aft acceleration 406 and the IMU pitch angle 408 may be fused using a complementary filter 412. Generally, the complementary filter 412 takes slow moving signals from the accelerometer and fast moving signals from the gyroscope and combines them. The accelerometer signals are passed through a low-pass filter and the gyroscope signals are passed through a high-pass filter and combined to give the final rate. A predicted ground speed 414 of the machine 100 is determined by the complementary filter 412 using the radar speed measurement 404, the IMU fore/aft acceleration 406, and the IMU pitch angle 408 while the machine 100 is moving from the first position to the second position. In one form, the predicted ground speed 414 is modified based on the determination of a steady state condition 416 as described below.

The drivetrain speed 402, the radar speed measurement 404, and the IMU fore/aft acceleration 406 can be used to assess a steady state determination 416. The controller 202 determines the steady state condition 416 by comparing respectively the commanded machine motion 220, the drivetrain speed 402, and the absolute acceleration 406 to a steady state machine motion, a steady state drivetrain speed, and a steady state acceleration. If a drivetrain steady state 420 is positive then an updated rolling radius of the wheel 422 is determined. An updated gear ratio 424 is determined from the updated rolling radius of the wheel 422. The updated gear ratio 424 and the updated rolling radius 422 are input into the drivetrain speed 402 to determine an adjusted drivetrain ground speed calculation 426. In a non-slip condition, the adjusted drivetrain ground speed 526 and the predicted ground speed 514 are fed back 534 to update the rolling radius 522 and then to the adjusted drivetrain ground speed 526 in a feedforward loop.

The adjusted drivetrain ground speed calculation 426 is compared to the predicted ground speed 414 in a slip speed calculation 430 to determine if a wheel or track is slipping. The slip speed calculation 430 determines if there either is or is not wheel or track slippage or a wheel slippage condition. If a wheel or track is slipping then a driveline command modification 432 is autonomously issued or generated to adjust a propulsion power of the drivetrain component until the wheel slippage condition reaches a specified target. The generating the driveline command modification 432 includes adjusting the propulsion power in many different techniques. For example, engaging a differential lock, generating an engine throttle command, generating a pump displacement command can be techniques to adjust the propulsion power to the drivetrain component until the wheel slippage reaches a specified target. In one form, the specified target is the predicted ground speed 414. In another form, the specified target is no wheel slippage occurring.

Figure 6:
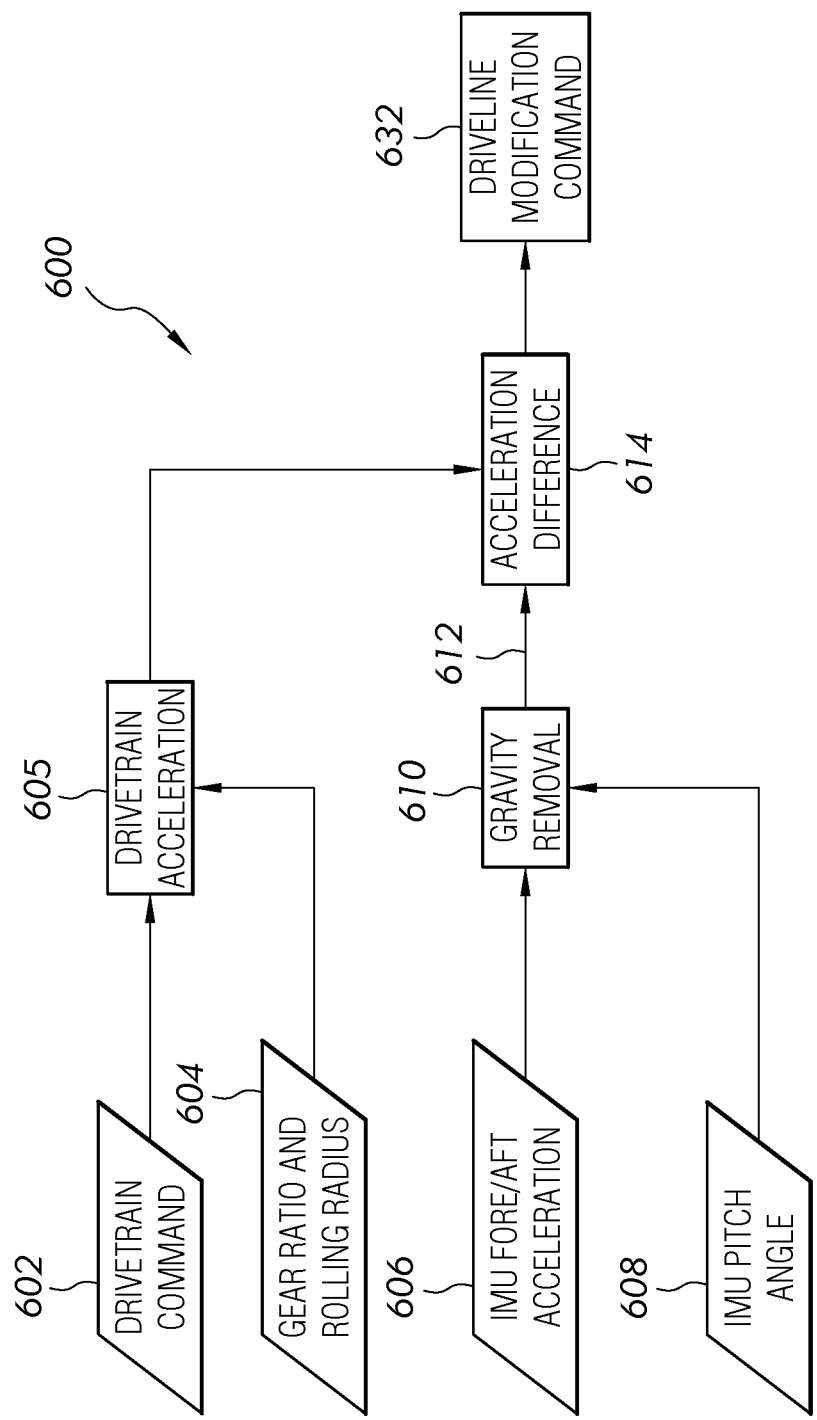
FIG. 6 is a schematic diagram of various inputs used in determining wheel slippage.

Turning now to FIG. 6 is a schematic diagram of various inputs used in determining wheel slippage 600. First, the work vehicle or machine 100 is moved a commanded machine motion 602 that includes movement of the work vehicle from a first position to a second position. A gear ratio and rolling radius 604 are measured and provided to determine a drivetrain acceleration 605 is determined from one or more of an engine speed, a pump command, and/or a motor speed. The drivetrain acceleration 605 can also be determined by using a drivetrain model that is representative of a frequency domain behavior of the drivetrain component, measuring at least one of a drivetrain component speed, a drivetrain component applied torque, and a drivetrain component displacement with a second sensor. In this form, the drivetrain acceleration 605 is based upon the drivetrain model, the second sensor measurement of the drivetrain component, and the commanded machine motion. The IMU 240 provides an IMU fore/aft acceleration 606 and a vehicle pitch angle or IMU Pitch Angle 608 to the controller 202. The IMU fore/aft acceleration 606 is an absolute acceleration.

The controller 202 then removes gravity 610 and the fore/aft acceleration 606 and the IMU pitch angle 608 may be fused using a complementary filter (not illustrated). The drivetrain acceleration 605 is compared to the absolute acceleration 612 to determine an acceleration difference 614. If the acceleration difference 614 is positive then a wheel or track is slipping. If the wheel or track is slipping then a driveline command modification 632 is autonomously issued or generated to adjust a propulsion power of the drivetrain component until the wheel slippage condition reaches a specified target. The generating the driveline command modification 632 includes adjusting the propulsion power in many different techniques. For example, engaging a differential lock, generating an engine throttle command, generating a pump displacement command are techniques to adjust the propulsion power to the drivetrain component until the acceleration difference reaches a specified target. In one form, the specified target is the absolute acceleration 612.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A method of determining wheel slippage in a work vehicle, the method comprising:
   moving the work vehicle in response to a commanded machine motion that includes movement of the work vehicle from a first position to a second position;
   determining a drivetrain ground speed of the work vehicle using a drivetrain component while the work vehicle is moving from the first position to the second position;
   determining a predicted ground speed of the work vehicle using an inertial measurement unit including an accelerometer to measure an acceleration of the work vehicle and a gyroscope or magnetometer to measure a dynamic orientation of the vehicle for vehicle axes of roll, pitch, and yaw, wherein the predicted ground speed is based on a fore/aft acceleration and a vehicle orientation in at least one of the vehicle axes, while the work vehicle is moving from the first position to the second position;
   detecting a wheel slippage condition by comparing the drivetrain ground speed to the predicted ground speed; and
   generating a driveline modification command to adjust a propulsion power of the drivetrain component until the wheel slippage condition reaches a specified target, wherein generating the driveline modification command includes engaging a differential lock to adjust the propulsion power to the drivetrain component until the wheel slippage condition reaches a specified target, wherein the specified target includes one of a predicted ground speed or no wheel slippage.

2. The method of claim 1, further comprising:
   stabilizing the inertial measurement unit by combing a drivetrain speed with a measured dynamic acceleration by adjusting a pitch angle measurement to provide an adjusted pitch angle;
   measuring an absolute acceleration with the stabilized inertial measurement unit while the work vehicle is moving from the first position to the second position, wherein the stabilized inertial measurement unit determines the absolute acceleration as an IMU fore/aft acceleration
   determining a steady state condition by comparing respectively the commanded machine motion, the drivetrain speed, and the absolute acceleration to a steady state machine motion, a steady state drivetrain speed, and a steady state acceleration; and
   adjusting the drivetrain ground speed based on the steady state condition to determine an adjusted drivetrain ground speed.

3. The method of claim 2, further comprising:
   wherein the work vehicle further includes a ground speed sensor;
   measuring an absolute speed with the ground speed sensor while the work vehicle is moving from the first position to the second position;
   determining a steady state condition by comparing respectively the commanded machine motion, the drivetrain speed, and the absolute speed to a steady state machine motion, a steady state drivetrain speed, and a steady state speed; and
   adjusting the drivetrain ground speed based on the steady state condition to determine an adjusted drivetrain ground speed.

4. The method of claim 3, further comprising:
   feeding back the adjusted drivetrain ground speed and the predicted ground speed to the adjusted drivetrain ground speed.

5. The method of claim 2, wherein the predicted ground speed includes measuring a pitch angle of the work vehicle as one of the at least one vehicle axes using the stabilized inertial measurement unit and wherein the measuring the absolute acceleration with the stabilized inertial measurement unit includes removing a gravitational component of the absolute acceleration by the stabilized inertial measurement unit.

6. The method of claim 1, wherein the generating the driveline modification command includes generating an engine throttle command to adjust the propulsion power to the drivetrain component until the wheel slippage condition reaches a specified target.

7. The method of claim 1, wherein the drivetrain component includes a hydrostatic motor, and the generating the driveline modification command includes generating one or more of a pump displacement command or a motor displacement command to adjust the propulsion power to the hydrostatic motor until the wheel slippage condition reaches a specified target.

8. A method for adjusting acceleration for a work vehicle, the method comprising:
   providing a work vehicle having a vehicular controller, an inertial measurement unit, and a drivetrain component;
   moving the work vehicle in response to a commanded machine motion that includes movement of the work vehicle from a first position to a second position;
   determining a drivetrain speed from one or more of an engine speed, a pump command, or a motor speed of the work vehicle;
   measuring a drivetrain acceleration based on the drivetrain component;
   stabilizing an inertial measurement unit by combining the drivetrain speed with a measured dynamic acceleration by adjusting a pitch measurement to provide an adjusted pitch measurement and adjusting a roll measure to provide an adjusted roll measurement;
   measuring an absolute acceleration of the work vehicle with the stabilized inertial measurement unit;
   removing a gravitational component of the absolute acceleration;
   measuring a pitch angle of the work vehicle with the stabilized inertial measurement unit;

using the measured pitch angle and the measured absolute acceleration lacking the gravitational component to predict a ground speed;

determining a steady state condition based on the commanded machine motion, the drivetrain speed, and the absolute acceleration; and modifying the predicted ground speed based on the determination of the steady state condition.

9. The method of claim 8, further comprising:
wherein the work vehicle includes a sensor;
measuring an absolute speed with the sensor while the work vehicle is moving from the first position to the second position; and
wherein the determining the steady state condition includes comparing respectively the commanded machine motion, the drivetrain speed, the absolute acceleration, and the absolute speed to a steady state machine motion, a steady state drivetrain speed, a steady state acceleration, and a steady state speed.

10. The method of claim 9, further comprising:
detecting a wheel slippage condition by comparing the drivetrain ground speed to the predicted ground speed; and
generating a driveline modification command to adjust a propulsion power of the drivetrain component until the wheel slippage condition reaches a specified target.

11. The method of claim 10, wherein the generating a driveline modification command includes engaging a differential lock to reduce the propulsion power to the drivetrain component until the wheel slippage condition reaches a specified target.

12. The method of claim 10, wherein the generating the driveline modification command includes generating an engine throttle command to reduce the propulsion power to the drivetrain component until the wheel slippage condition reaches a specified target.

13. The method of claim 10, wherein the drivetrain component includes a hydrostatic motor, and the generating the driveline modification command includes generating one or more of a pump displacement command or a motor displacement command to adjust the propulsion power to the hydrostatic motor until the wheel slippage condition reaches a specified target.

14. A method of determining wheel slippage condition in a work vehicle, the method comprising:
moving the work vehicle in response to a commanded machine motion that includes movement of the work vehicle from a first position to a second position;
determining a drivetrain speed from one or more of an engine speed, a pump command, or a motor speed of the work vehicle;
determining a drivetrain acceleration of the work vehicle using a drivetrain component while the work vehicle is moving from the first position to the second position;
stabilizing an inertial measurement unit by combining the drivetrain speed with the dynamic acceleration by adjusting a pitch measurement to provide an adjusted pitch measurement;
measuring a fore/aft acceleration of the work vehicle using the stabilized inertial measurement unit while the work vehicle is moving from the first position to the second position;
measuring a pitch angle of the work vehicle with the stabilized inertial measurement unit;
fusing the fore/aft acceleration and the measured pitch angle to determine an absolute acceleration;
comparing the drivetrain acceleration to the absolute acceleration to determine an acceleration difference; and
generating a driveline modification command to adjust a propulsion power of the drivetrain component to thereby reduce the acceleration difference.

15. The method of claim 14, wherein the generating the driveline modification command includes engaging a differential lock to reduce the propulsion power to the drivetrain component until the acceleration difference reaches a specified target.

16. The method of claim 14, wherein the generating the driveline modification command includes generating an engine throttle command to reduce the propulsion power to the drivetrain component until the acceleration difference reaches a specified target.

17. The method of claim 14, wherein the drivetrain component includes a hydrostatic motor, and the generating the driveline modification command includes generating one or more of a pump displacement command or a motor displacement command to adjust the propulsion power to the hydrostatic motor until the wheel slippage condition reaches a specified target.

18. The method of claim 14, wherein the determining the drivetrain acceleration further comprises:
using a drivetrain model that is representative of a frequency domain behavior of the drivetrain component;
measuring at least one of a drivetrain component speed, a drivetrain component applied torque, and a drivetrain component displacement with a sensor; and
determining the drivetrain acceleration based upon the drivetrain model, the sensor measurement of the drivetrain component, and the commanded machine motion.

* * * * *